US012797973B2

(12) United States Patent
Vincent et al.

(10) Patent No.: US 12,797,973 B2
(45) Date of Patent: Nov. 17, 2026

(54) MILLING CUTTER

(71) Applicant: SECO TOOLS AB, Fagersta (SE)

(72) Inventors: Mathieu Vincent, Bourges (FR); Julien Duchalais, Bourges (FR)

(73) Assignee: Seco Tools AB, Fagersta (SE)

( * ) Notice: Subject to any disclaimer, the term of this patent is extended or adjusted under 35 U.S.C. 154(b) by 896 days.

(21) Appl. No.: 17/636,538

(22) PCT Filed: Aug. 18, 2020

(86) PCT No.: PCT/EP2020/073081
§ 371 (c)(1),
(2) Date: Feb. 18, 2022

(87) PCT Pub. No.: WO2021/032729
PCT Pub. Date: Feb. 25, 2021

(65) Prior Publication Data

US 2022/0297206 A1 Sep. 22, 2022

(30) Foreign Application Priority Data

Aug. 21, 2019 (EP) ..................................... 19192904

(51) Int. Cl.
*B23C 5/08* (2006.01)
*B23C 5/28* (2006.01)
*B23C 5/20* (2006.01)

(52) U.S. Cl.
CPC .................. *B23C 5/08* (2013.01); *B23C 5/28* (2013.01); *B23C 5/20* (2013.01); *B23C 5/282* (2022.02)

(58) Field of Classification Search
CPC ............ B23C 2250/12; B23C 2240/32; B23C 2210/02; B23C 5/282; B23C 5/28; B23C 5/26; B23C 5/08; B23C 5/1072
See application file for complete search history.

(56) References Cited

U.S. PATENT DOCUMENTS

2002/0106251 A1* 8/2002 Ripley ...................... B23C 5/28 407/43
2012/0039676 A1* 2/2012 Marshansky ......... B23C 5/1072 407/56

FOREIGN PATENT DOCUMENTS

| | | | |
|---|---|---|---|
| CN | 111085716 A * | 5/2020 | |
| DE | 10145006 A1 | 4/2003 | |
| DE | 102007001864 A1 | 7/2008 | |
| DE | 102017131001 A1 | 6/2019 | |

(Continued)

*Primary Examiner* — Sunil K Singh
*Assistant Examiner* — Eric Daniel Whitmire
(74) *Attorney, Agent, or Firm* — Corinne R. Gorski

(57) ABSTRACT

A milling cutter includes a front end part and a back end part. The front end part includes a disc-shaped cutter body having a front side, a rear side, a central axis, and a number of insert seats. A primary holding member extends from the rear side. The back end part includes a secondary holding member, which engages the primary holding member when the front and back end parts are mounted to each other. The disc-shaped cutter body has a central cylindrical aperture extending coaxially with the central axis and including an inner cylindrical surface. An outer cylindrical surface is provided on a front portion of the secondary holding member. The inner cylindrical surface abuts the outer cylindrical surface in an abutting region between the front and the rear sides to center the front and back end parts.

17 Claims, 14 Drawing Sheets

(56) References Cited

FOREIGN PATENT DOCUMENTS

| | | | | | |
|---|---|---|---|---|---|
| EP | 3321018 | A1 | | 5/2018 | |
| JP | 6779337 | B1 | * | 11/2020 | ........... B23C 5/1063 |

* cited by examiner

MILLING CUTTER

RELATED APPLICATION DATA

This application is a § 371 National Stage Application of PCT International Application No. PCT/EP2020/073081 filed Aug. 18, 2020 claiming priority to EP 19192904.1 filed Aug. 21, 2019.

TECHNICAL FIELD OF THE INVENTION

The present invention refers generally to a milling cutter to be attached to a machine or to a holder, and comprising two parts, a front end part and a back end part mounted and locked to each other to form the milling cutter. More specifically, the present invention refers to a milling cutter according to the preamble of claim 1.

BACKGROUND AND PRIOR ART

DE 101 45 006 A1 discloses a cooling system for a disc cutter with a holder forming a disc-shaped cutter body for a plurality changeable cutting inserts. There are coolant outlet apertures in the holder, through which coolant may be supplied to the cutting inserts. Coolant transporting channels are provided in the holder for the passage of the coolant. The holder comprises an engagement member extending rearwards from a rear side of the disc-shaped cutter body. The engagement member comprises a central recess for engagement with a machine or holder.

A problem of the prior art is the requirement of an accurate centering and holding of the disc-shaped cutter body. A high accuracy may be difficult to achieve with the disc cutter of DE 101 45 006. An exact centering and rigid holding of the disc-shaped cutter body is required in order to achieve a satisfying accuracy of the milling operation.

A further problem is to provide an efficient cooling of the disc-shaped cutter body and the cutting inserts in order to maintain the lifetime of the tool. The supply of cooling liquid is an intricate task since the disc-shaped cutter bodies normally have a thin thickness.

In the prior art disc-shaped cutter bodies, the liquid channels for the cooling frequently cannot extend straight but at least one change of direction is needed in order to be able to deliver the cooling liquid at an outer periphery of the disc-shaped cutter body, see DE 101 45 006.

A still further problem is the manufacturing of the disc-shaped cutter body and the insert seats, especially insert seats extending through the rear side of the disc-shaped cutter body.

SUMMARY OF THE INVENTION

The purpose of the present invention is to overcome the problems discussed above, and in particular to provide an improved centering and holding of a milling cutter having a disc-shaped cutter body. Furthermore, it is aimed at an efficient cooling of the milling cutter and the cutting inserts in order to maintain and improve the lifetime of the tool as well as an efficient chip evacuation from the groove that is to be machined in the work-piece. Still further, it is aimed at a structure of a milling cutter having a disc-shaped cutter body that enables an easy and efficient manufacturing of the milling cutter, and especially of the insert seats and of the liquid channels.

This purpose is achieved by the milling cutter comprising a front end part and a back end part, the front end part comprising a disc-shaped cutter body having a front side and a rear side and configured to rotate in a rotary direction around a central axis, a number of insert seats arranged at an outer periphery of the disc-shaped cutter body, and a primary holding member extending around and along the central axis from the rear side of the disc-shaped cutter body and away from the disc-shaped cutter body. The milling cutter is characterized in that the back end part comprises a secondary holding member engaging the primary holding member when the front end part and the back end part are mounted to each other to form the milling cutter,

- that the disc-shaped cutter body comprises a central cylindrical aperture extending coaxially with the central axis,
- that the central cylindrical aperture comprises an inner cylindrical surface,
- that the secondary holding member comprises an outer cylindrical surface provided on a front portion of the secondary holding member of the back end part, and
- that the inner cylindrical surface is abutting the outer cylindrical surface in an abutting region axially located at least between the front side and the rear side in order to center the front end part and the back end part to each other when the front end part and the back end part are mounted to each other to form the milling cutter.

Adjacent to at least one insert seat, preferably to each insert seat, a chip room may be arranged as a part of the outer periphery.

By configuring the milling cutter in two parts, the manufacturing of the milling cutter is less complicated, in particular since the two parts may be manufactured separately from each other, and the manufacturing of one part may be performed without being disturbed by the other part. In particular, the manufacturing of the front end part and the disc-shaped cutter body may be facilitated since access to the insert seats, especially on the rear side, may be obtained while not being obstructed by a large rearwards extending holding part. This is so at least partly because of the front portion being configured to extend into the central cylindrical aperture meaning that the primary holding member may have a relatively short axial extension.

The mounting of the primary holding member of the front end part and the secondary holding member of the back end part to each other may comprise or form a mounting and locking interface. The locking interface may form a rigid and secure engagement between the front and part and the back end part. The locking interface is also torque transmitting, i.e. a torque from the machine spindle is transmitted from the back end part to the front end part via the locking interface arranged in the primary holding member and the secondary holding member. Thanks to this, no torque transmitting arrangement need to be placed in any of the central cylindrical aperture and the front portion of the secondary holding member. Thus, the inner cylindrical surface and the outer cylindrical surface can be manufactured easier and with a better precision.

Thanks to the fact that the inner cylindrical surface is abutting the outer cylindrical surface in an abutting region axially located between, or at least between, the front side and the rear side, the centering of the front end part on the back end part may be improved since the forces arising during the milling operation of the milling cutter may extend radially straight inwardly to the abutting region. The insert seats, and the cutting inserts, may thus be located at the same, or substantially the same, axial position as the abutting region which also makes it easier to achieve necessary tolerances when manufacturing the insert seats. Consequently, no oblique loads will exist that could stress the abutting region, meaning that the centering and the holding of the disc-shaped cutter body may remain stable and secure during the milling operation.

According to an embodiment of the invention, the primary holding member is integrally formed with the disc-shaped cutter body.

According to an embodiment of the invention, the secondary holding member is integrally formed with the back end part.

According to an embodiment of the invention, the inner cylindrical surface is an inner circular cylindrical surface, or inner continuously cylindrical surface. Thus, the inner cylindrical surface may be uninterrupted in a circumferential direction. In the same way, the outer cylindrical surface may be an outer circular cylindrical surface, or outer continuously cylindrical surface.

Thus, the outer cylindrical surface may be uninterrupted in a circumferential direction.

According to an embodiment of the invention, the inner cylindrical surface and the outer cylindrical surface may, especially at the abutting region, present a tolerance that is h6/H6.

According to an embodiment of the invention, liquid channels extend outwardly in the disc-shaped cutter body to a respective liquid outlet through the outer periphery of the disc-shaped cutter body, wherein the liquid channels are located between the front side and the rear side of the disc-shaped cutter body. Advantageously, the liquid channels may extend outwardly from the central cylindrical aperture. Thanks to this, in combination with the fact that the locking interface is arranged in the primary holding member and the secondary holding member, i.e. outside the central cylindrical aperture and the front portion of the secondary holding member, a leakage of liquid may be decreased in the area of the central cylindrical aperture and the front portion of the secondary holding member during transition of the liquid from the back end part and the front end part. As a result of that, no seals are required between the front end part and the back end part. In particular, the liquid channels may extend in parallel, or substantially in parallel, with the front side and the rear side.

The liquid channels may provide an efficient cooling of the disc-shaped cutter body and the cutting inserts, which contributes to a long lifetime of the milling cutter and the cutting inserts. The liquid channels, located between the front side and the rear side of the disc-shaped cutter body, may have a straight extension and may lie in a common plane, especially in an axial plane or a substantially axial plane.

In particular, each liquid channel may extend along a respective straight line from and through the outer periphery to and into the central cylindrical aperture of the disc-shaped cutter body, especially through the inner cylindrical surface. The liquid channels may thus be easily produced through drilling of a straight hole from the outer periphery to the central cylindrical aperture.

According to an embodiment of the invention, the inner cylindrical surface and the outer cylindrical surface are configured to form an annular channel extending around the front portion of the secondary holding member, wherein the liquid channels extend outwardly from the annular channel.

The annular channel may form a distribution space for delivering equal quantities of liquid to the liquid channels. The annular channel and the liquid channels may be located at a common axial position. The annular channel preferably divides the abutting region into two abutting sub-regions.

According to an embodiment of the invention, the annular channel comprises at least one of a primary annular groove extending through the inner cylindrical surface and a secondary annular groove extending through the outer cylindrical surface.

Thus, the annular channel may be formed by the primary annular groove, extending through the inner cylindrical surface of the disc-shaped cutter body, and the outer cylindrical surface. In this case the annular channel may have a semicircular cross-section. The primary annular groove preferably divides the abutting region into two abutting sub-regions.

Alternatively, the annular channel may be formed by the secondary annular groove, extending through the outer cylindrical surface of the front portion of the secondary holding member, and the inner cylindrical surface. Also in this case the annular channel may have a semicircular cross-section. The secondary annular groove preferably divides the abutting region into two abutting sub-regions.

According to a further alternative, the annular channel may be formed by the primary annular groove, extending through the inner cylindrical surface of the disc-shaped cutter body, and the secondary annular groove extending through the outer cylindrical surface of the front portion of the secondary holding member. The primary annular groove and the secondary annular groove may have the same axial position. The annular channel, formed by the primary annular groove and the secondary annular groove, may have a circular cross-section or a substantially circular cross-section. Also in this case, the annular channel preferably divides the abutting region into two abutting sub-regions.

According to an embodiment of the invention, the primary annular groove divides the inner cylindrical surface into two inner cylindrical sub-faces. Both of the two inner cylindrical sub-faces may abut the outer cylindrical surface.

According to an embodiment of the invention, the secondary annular groove divides the outer cylindrical surface into two outer cylindrical sub-faces. Both of the two outer cylindrical sub-faces may abut the inner cylindrical surface.

In case, the annular surface is formed by the primary annular groove and the secondary annular groove, the inner cylindrical sub-faces may abut a respective one of the outer cylindrical sub-faces.

According to an embodiment of the invention, the back end part encloses a liquid supply channel extending through the secondary holding member and comprising a central channel extending axially in the back end part, and a number of distribution channels extending outwardly from the central channel through the front portion of the secondary holding member to a respective intermediate outlet in order to permit liquid transport from the liquid supply channel to the liquid channels. The liquid supply channel of the back end part may thus contribute to an efficient supply of liquid to the intermediate outlets. The central channel and the distribution channels may have a circular cross-section. The cross-sectional area of the central channel is preferably equal to a sum of the cross-sectional areas of the distribution channels. The respective cross-sectional area is measured in a section perpendicular to a direction of extension of respective channel.

According to an embodiment of the invention, the at least one intermediate outlet adjoins the annular channel. The distribution channel, or distribution channels, may thus adjoin the annular channel permitting liquid to be supplied via the central channel and the distribution channels into the annular channel and from there via the liquid channels to the liquid outlets.

According to an embodiment of the invention, the primary holding member comprises an inner engagement region located at an axial distance from the rear side of the disc-shaped cutter body and from the central cylindrical aperture and cooperating with an outer engagement region of the secondary holding member.

The mounting and locking interference, mentioned above, may, at least partly, be achieved by means of the cooperation of the inner engagement region and the outer engagement region. The inner engagement region and the outer engagement region may have a respective central axis being coaxial with central axis of the disc-shaped cutter body.

According to an embodiment of the invention, the inner engagement region comprises an inner thread and the outer engagement region an outer thread, wherein the inner thread and the outer thread engage each other when the front end part and the back end part are mounted to each other to form the milling cutter.

According to an embodiment of the invention, the inner thread and the outer thread are configured as right handed threads, when the disc-shaped cutter body is configured as a right handed tool. Thus, the milling operation may have a tightening effect on the thread engagement.

According to an embodiment of the invention, the front portion of the secondary holding member comprises a front surface lying in a plane common to the front side of the disc-shaped cutter body when the front end part and the back end part are mounted to each other to form the milling cutter. The milling cutter may thus be used as an end mill cutter for forming a plane surface since no parts, except for the edges of the cutting inserts, need to protrude beyond the front side of the disc-shaped cutter body.

According to an embodiment of the invention, the disc-shaped cutter body comprises a number of cutting inserts provided in a respective one of the insert seats.

According to an embodiment of the invention, the liquid outlets are located in front of a respective one of the cutting inserts with regard to the rotary direction. The liquid supplied through the liquid outlets may thus contribute to a proper cooling of the cutting inserts and the workpiece, and to an efficient removal of chips from the milling region.

According to an embodiment of the invention, the liquid channels extend outwardly in a respective outward direction towards an active cutting edge of the respective cutting insert. Liquid supply to the region where the milling operation takes place may thus be achieved.

According to an embodiment of the invention, the insert seats comprise front insert seats, extending from the front side, and rear insert seats, extending from the rear side, wherein the front insert seats and the rear insert seats are arranged in an alternating order along the outer periphery of the disc-shaped cutter body. The front insert seats are arranged at a distance and separated from the rear side. The rear side insert seats are arranged at a distance and separated from the front side.

According to an embodiment of the invention, the primary holding member of the front end part comprises a major cylindrical zone and a minor transition zone, connecting the major cylindrical zone to the rear side of the disc-shaped cutter body, wherein the back end part has a largest outer diameter that is larger than a largest outer diameter of the major cylindrical zone.

Thanks to this difference of the outer diameters in combination with the fact that the milling cutter comprises a front end part and a back end part which are manufactured separately and assembled together, the back end part may be given a rear abutment surface large enough to achieve a good and stable connection with a holder or a machine. At the same time, the primary holding member may be given a relatively small diameter which facilitates easy manufacturing of the insert seats in the rear side of the disc-shaped cutter body. The relatively small diameter of the primary holding member may also offer the possibility to have an even smaller cutting diameter of the milling cutter, i.e. a smaller diameter of the disc-shaped cutter body.

BRIEF DESCRIPTION OF THE DRAWINGS

The present invention is now to be explained more closely by means of the following description of preferred embodiments and with reference to the drawings attached hereto.

DETAILED DESCRIPTION OF VARIOUS EMBODIMENTS OF THE INVENTION

FIGS. 1*a*-1*i* refer to a first embodiment of a milling cutter M. The milling cutter M comprises two parts 1, 2, a front end part 1 and a back end part 2.

The front end part 1 comprises a disc-shaped cutter body 3 having a front side 3*a* and a rear side 3*b*. The front end part 1, with the disc-shaped cutter body 3, and the back end part 2 are configured to rotate in a rotary direction R around a central axis X. The central axis X thus forms a common central axis for the front end part 1 and the back end part 2.

Figure 1A:
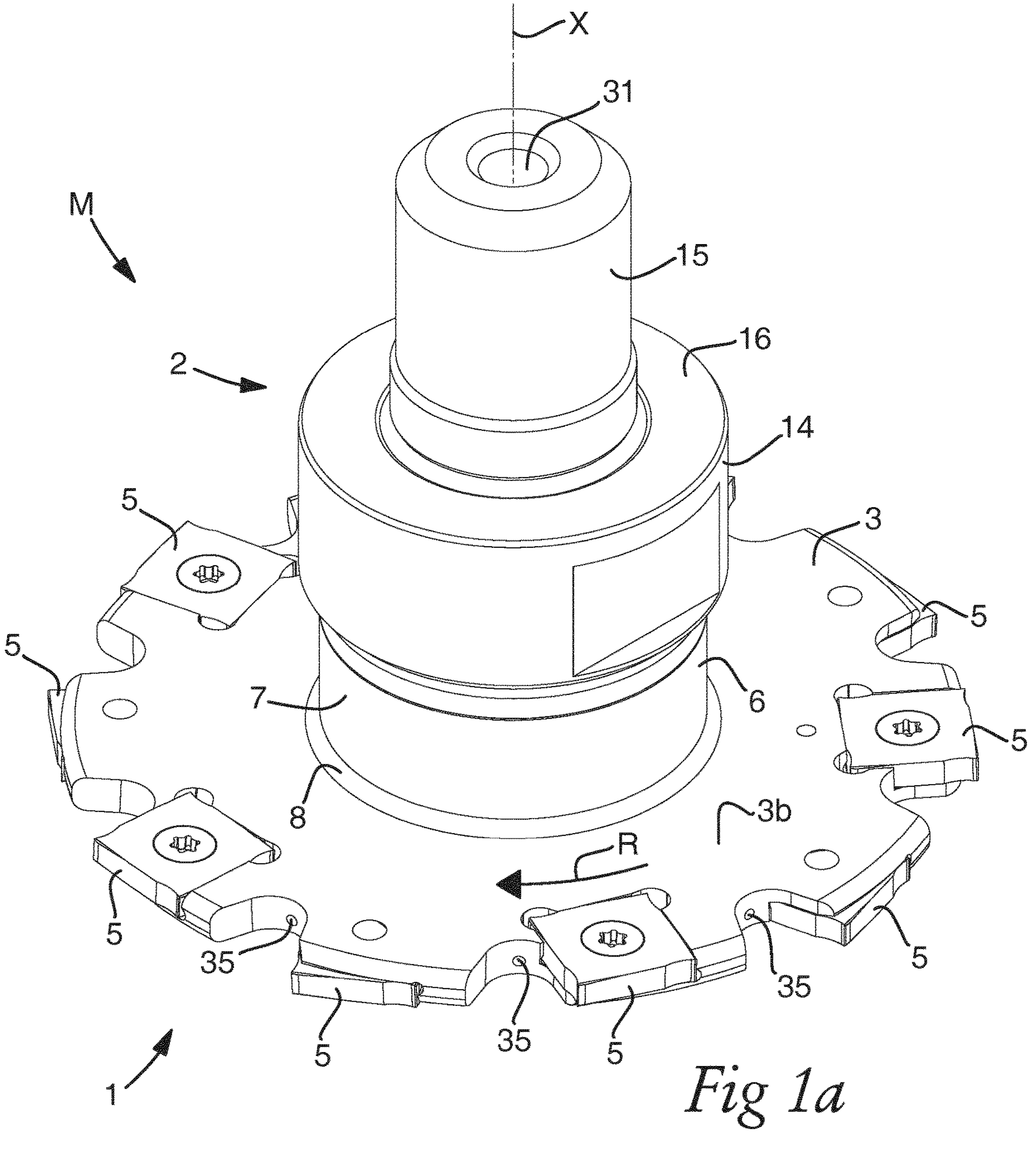
FIG. 1*a* discloses a perspective rear view of a milling cutter according to a first embodiment of the invention.
Figure 1B:
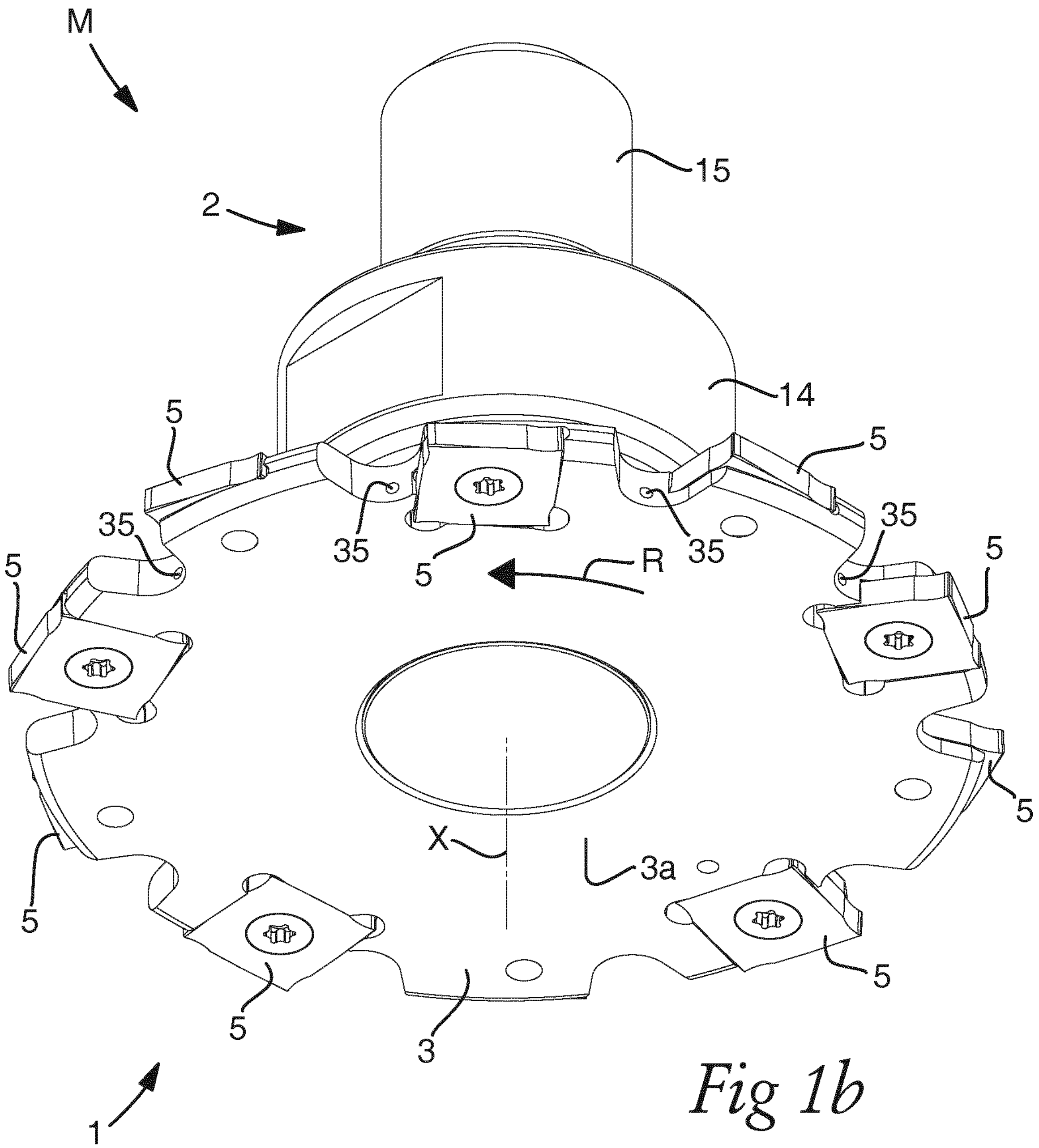
FIG. 1*b* discloses a perspective front view of the milling cutter in FIG. 1*a*.
Figure 1C:
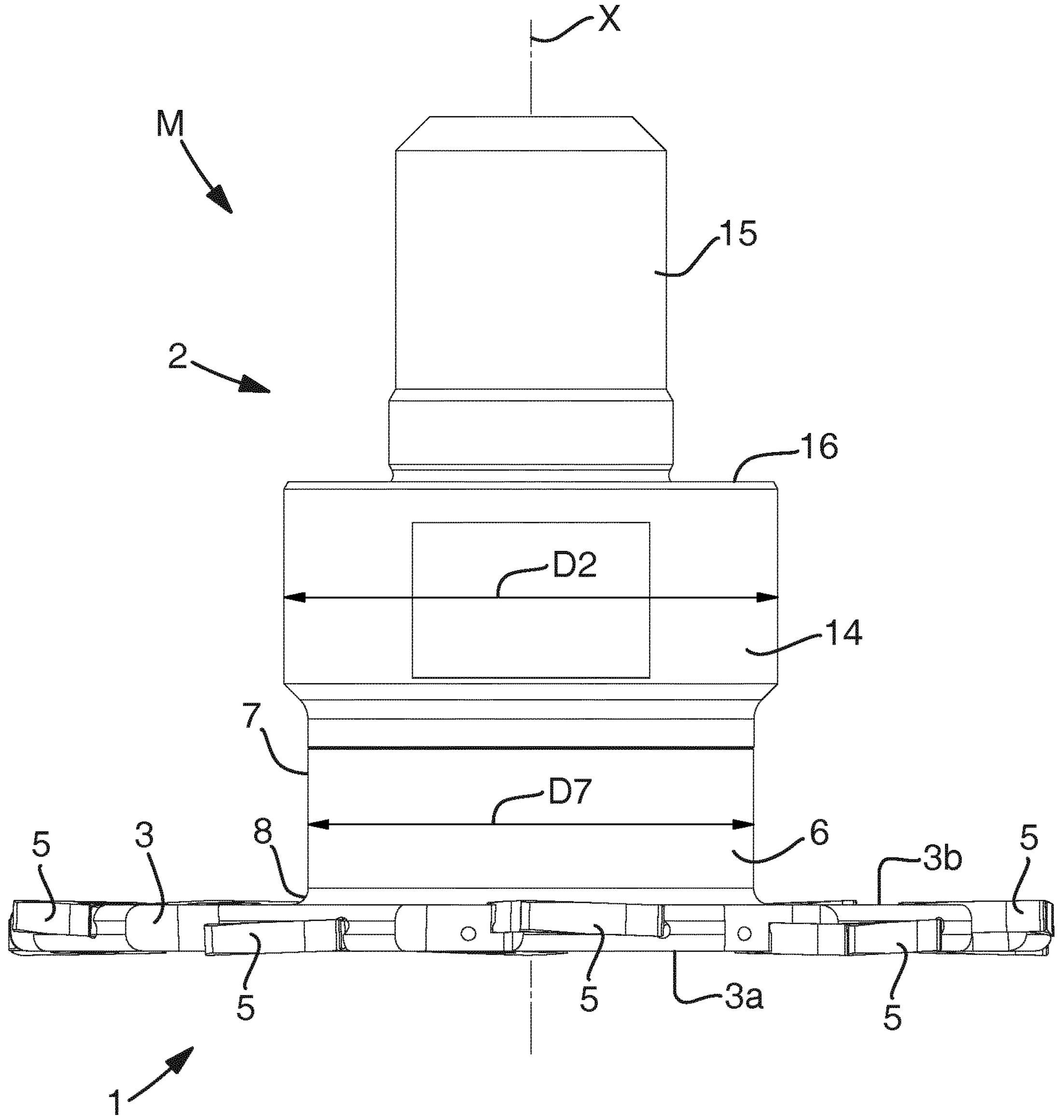
FIG. 1*c* discloses a side view of the milling cutter in FIG. 1*a*.
Figure 1D:
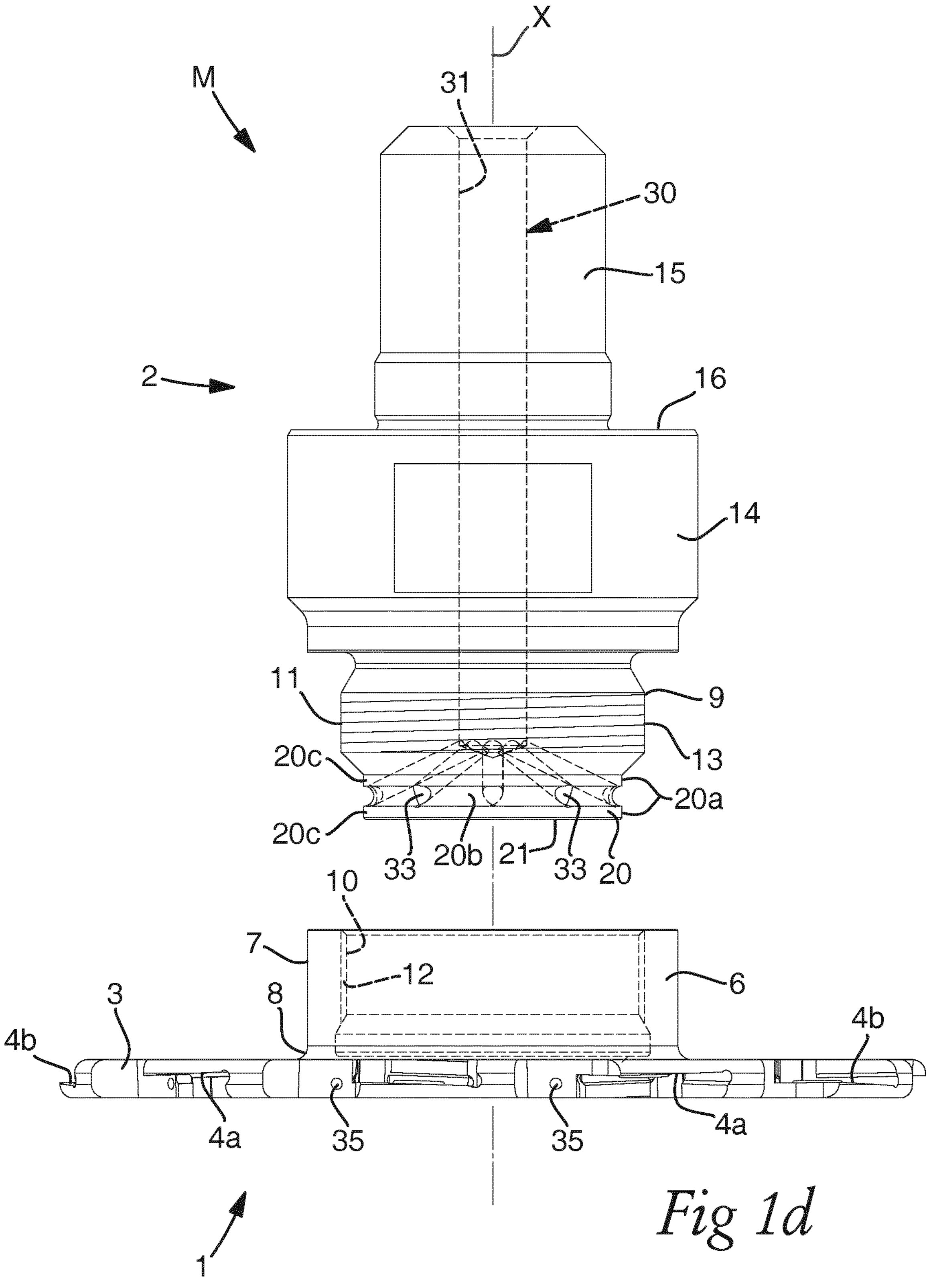
FIG. 1*d* discloses an exploded side view of the milling cutter in FIG. 1*a*.

A number of insert seats 4*a*, 4*b* are arranged at an outer periphery of the disc-shaped cutter body 3, see FIG. 1*d*. In the first embodiment, the disc-shaped cutter body 3 comprises ten insert seats 4*a*, 4*b*.

The insert seats 4*a*, 4*b* comprise front insert seats 4*a*, extending from the front side 3*a*, and rear insert seats 4*b*, extending from the rear side 3*b*, as can be seen in FIG. 1*d*. In the first embodiment, there are five front insert seats 4*a* and five rear insert seats 4*b*. The front insert seats 4*a* and the rear insert seats 4*b* are arranged in an alternating order along the outer periphery of the disc-shaped cutter body 3.

The disc-shaped cutter body 3 may comprises a number of cutting inserts 5 provided in a respective one of the insert seats 4*a*, 4*b*, as can be seen in FIGS. 1*a* and 1*b*.

Figure 1E:
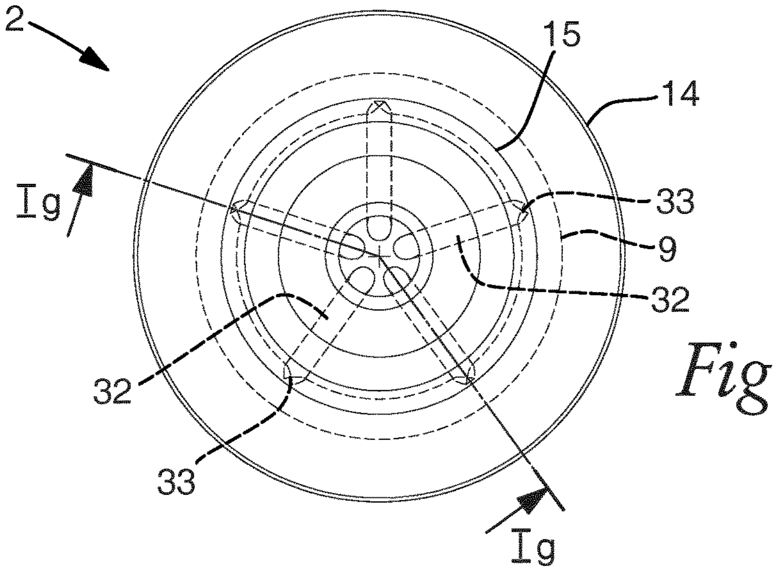
FIG. 1*e* discloses a rear view of a back end part of the milling cutter in FIG. 1*a*.
Figure 1F:
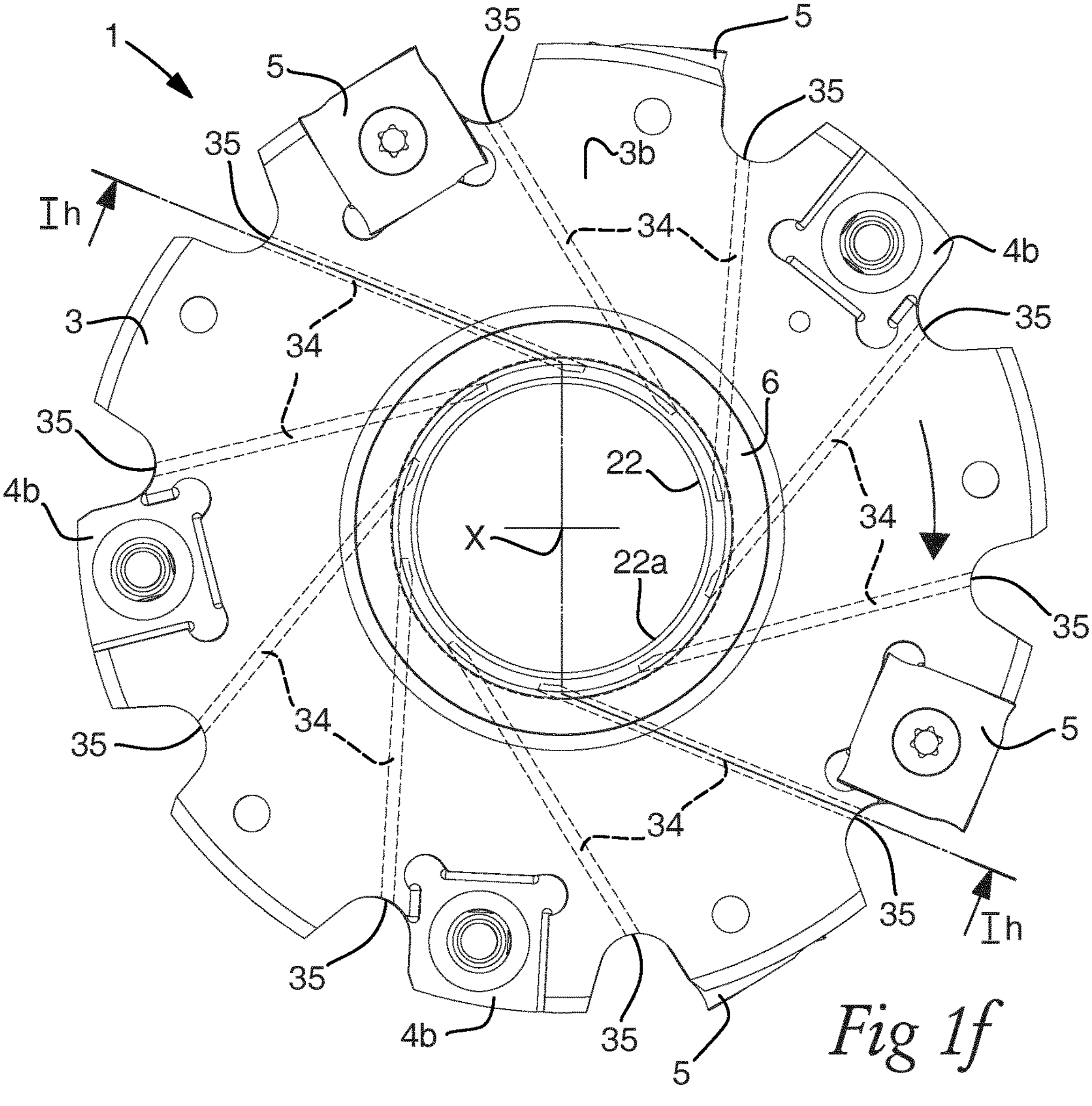
FIG. 1*f* discloses a rear view of a front end part of the milling cutter in FIG. 1*a*.

The front end part 1 also comprises a primary holding member 6 extending around and along the central axis X from the rear side 3*b* of the disc-shaped cutter body 3, see FIGS. 1*d*, 1*f* and 11*h*. The primary holding member 6 may be integrally formed with the disc-shaped cutter body 3.

The primary holding member 6 of the front end part 1 may comprise a major cylindrical zone 7 and a minor transition zone 8, connecting the major cylindrical zone 7 to the rear side 3*b* of the disc-shaped cutter body 3. The major cylindrical zone 7 has a largest outer diameter D7, see FIG. 1*c*. The minor transition zone 8 may have a radius of curvature.

Figure 1G:
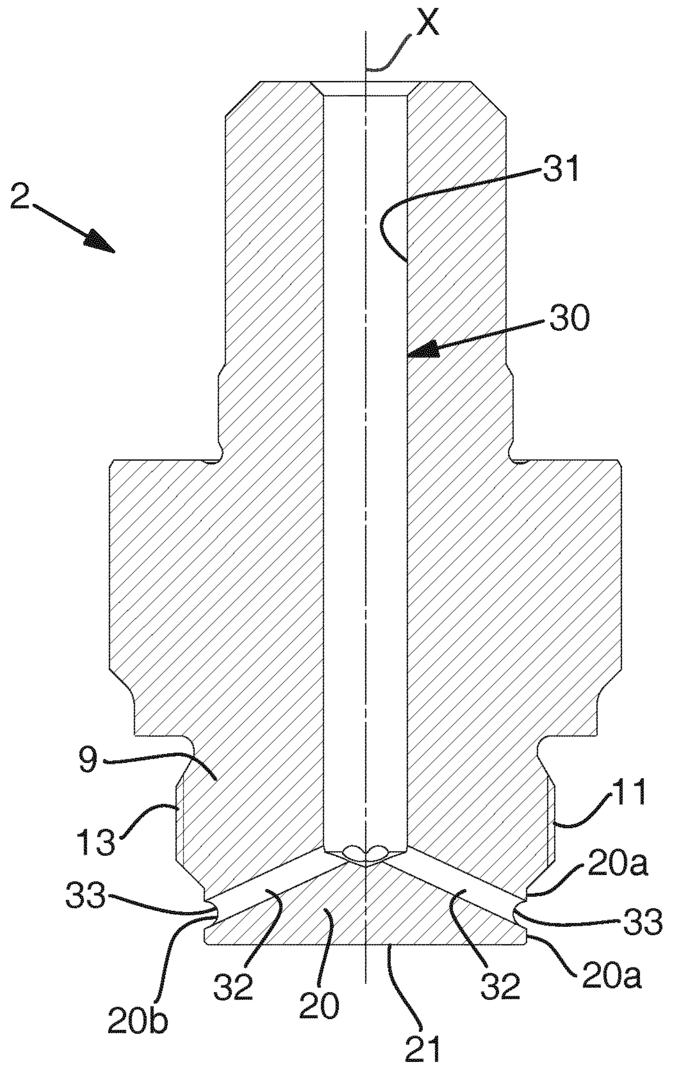
FIG. 1*g* discloses a sectional view through the back end part along the line Ig-Ig in FIG. 1*e*.

The back end part 2 comprises a secondary holding member 9 that may be integrally formed with the back end part 2, see FIGS. 1*d*, 1*e* and 1*g*. The secondary holding member 9 engages the primary holding member 6 when the front end part 1 and the back end part 2 are mounted to each other to form the milling cutter M, see FIGS. 1*c* and 1*i*.

As can be seen in FIG. 1*d*, the primary holding member 6 may comprise an inner engagement region 10 located at an axial distance from the rear side 3*b* of the disc-shaped cutter body 3. The secondary holding member 9 may comprise an outer engagement region 11. The inner engagement region 10 cooperates with the outer engagement region 11 when the front end part 1 and the back end part 2 are mounted to each other to form a mounting and locking interface of the milling cutter M, see FIG. 1*i*.

In the first embodiment, the inner engagement region 10 comprises an inner thread 12 and the outer engagement region 11 comprises an outer thread 13. The inner thread 12 and the outer thread 13 engage each other when the front end part 1 and the back end part 2 are mounted to each other to form the milling cutter M.

Figure 2A:
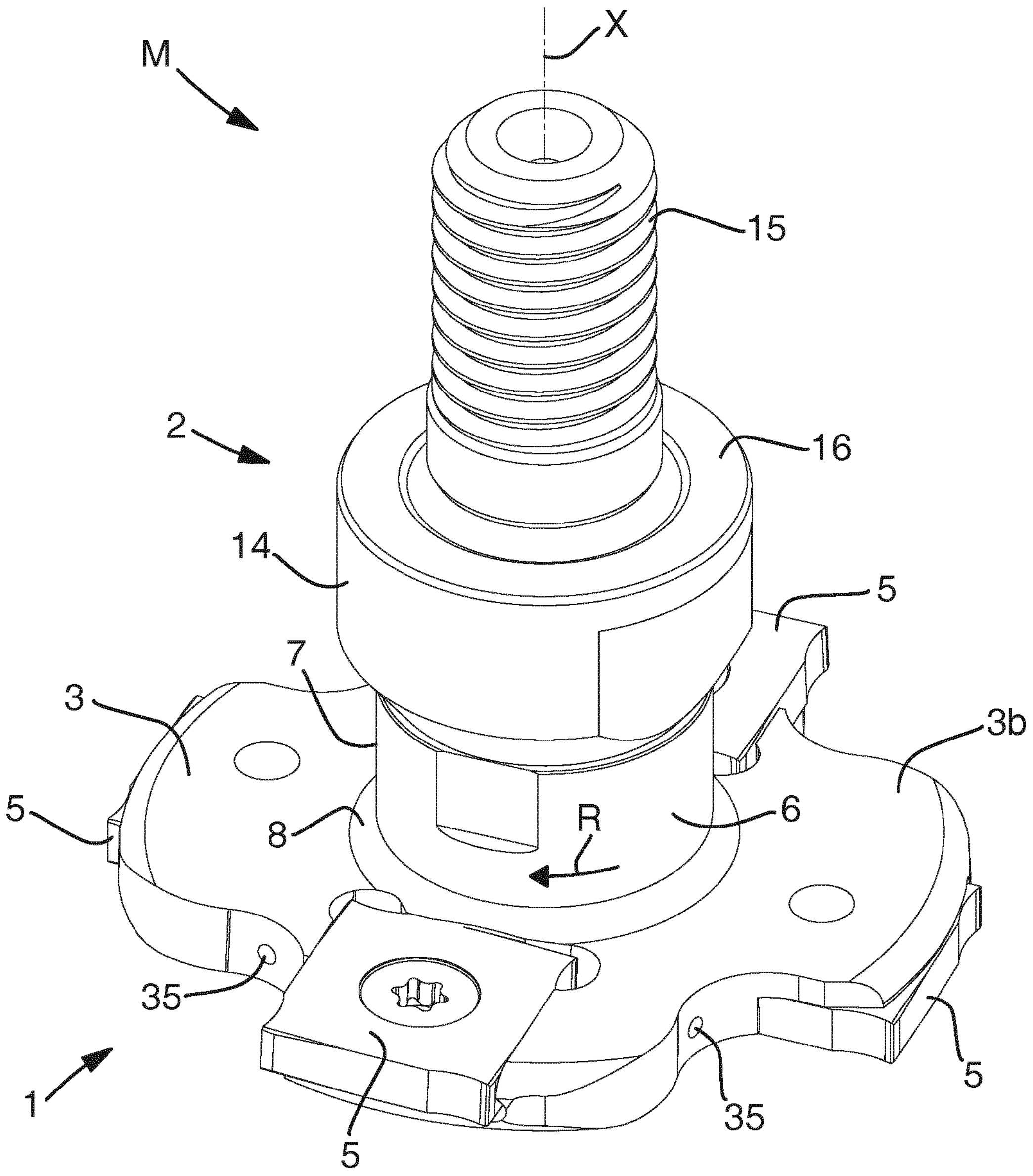
FIG. 2*a* discloses a perspective rear view of a milling cutter according to a second embodiment of the invention.
Figure 2B:
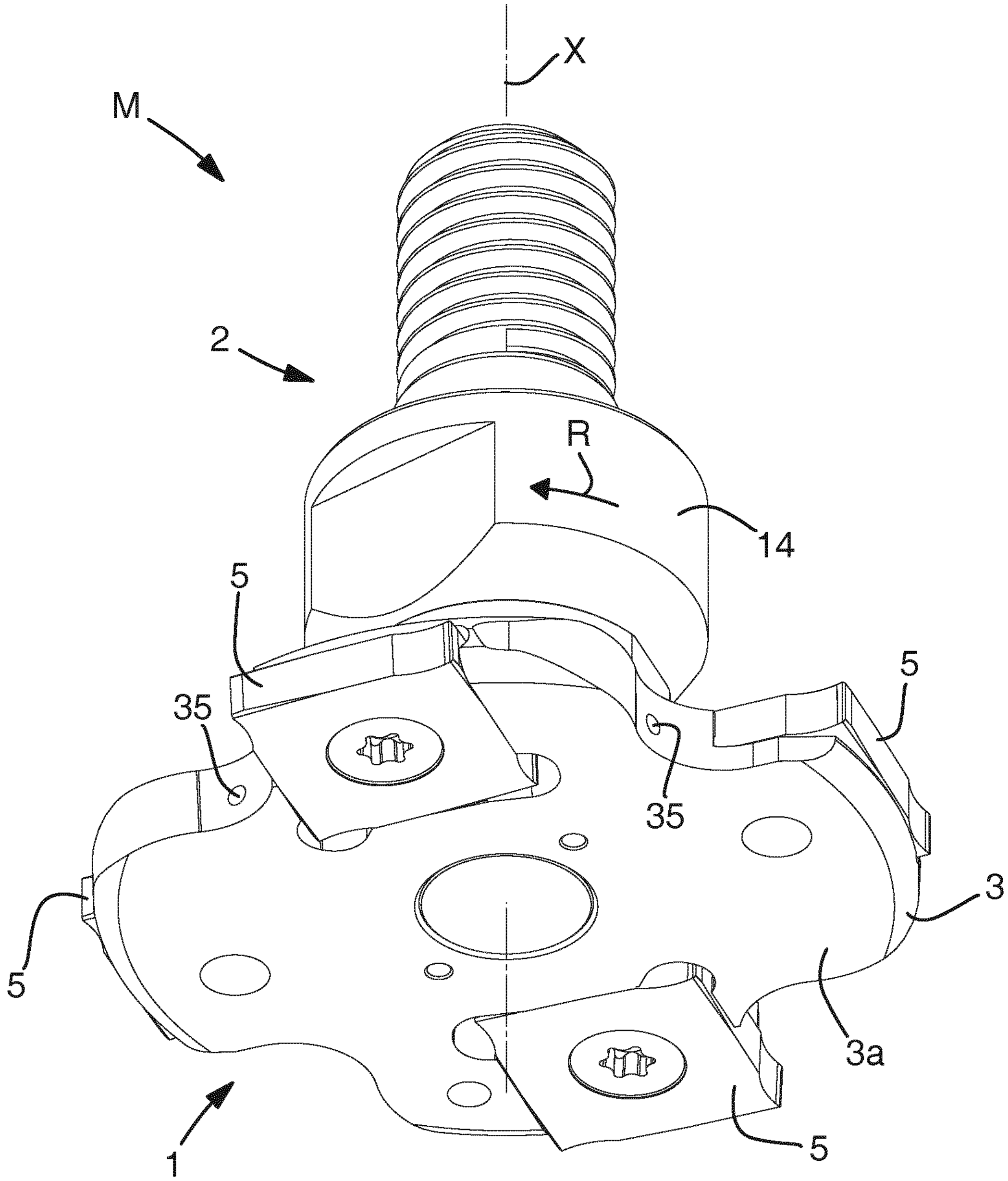
FIG. 2*b* discloses a perspective front view of the milling cutter in FIG. 2*a*.
Figure 2C:
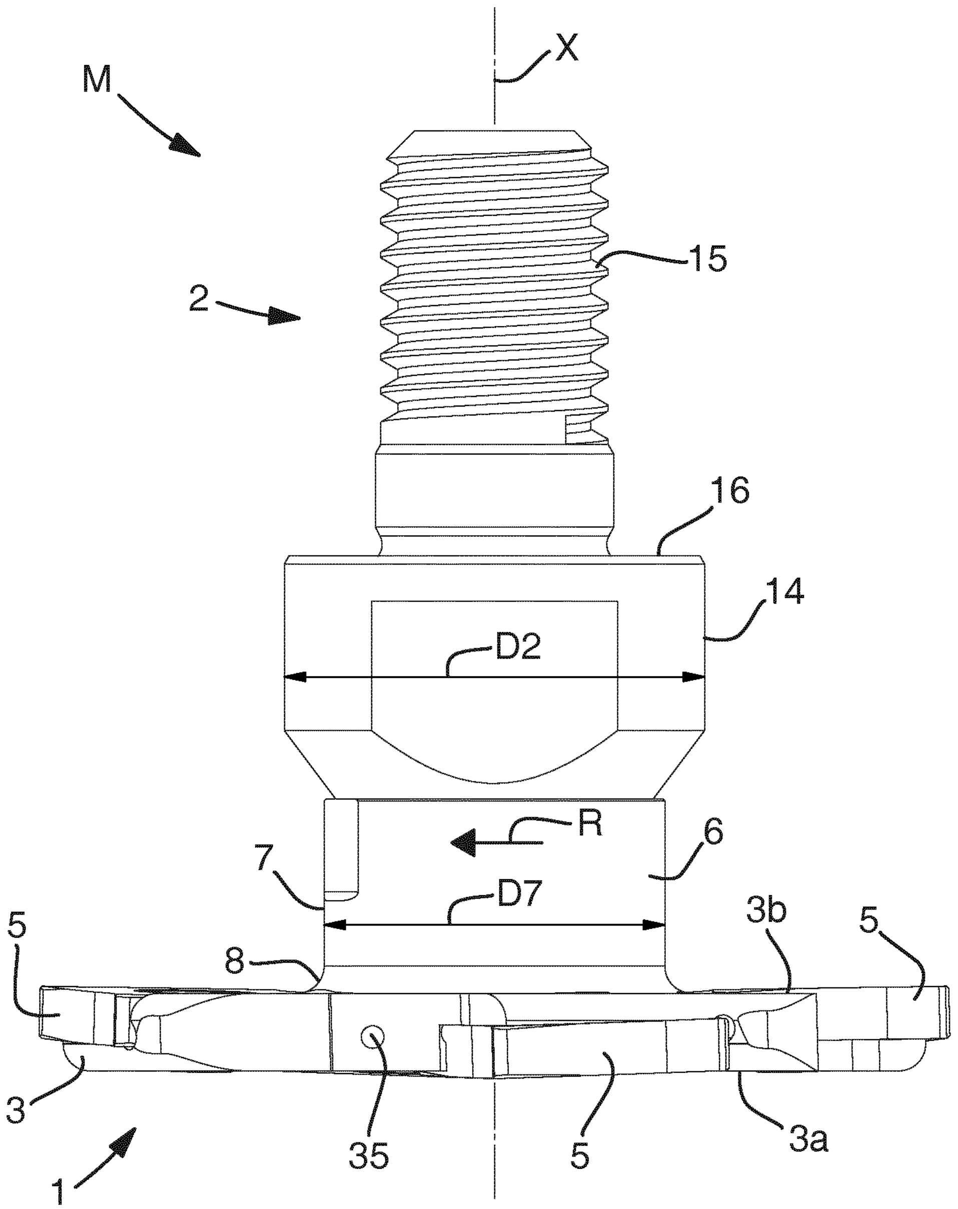
FIG. 2*c* discloses a side view of the milling cutter in FIG. 2*a*.
Figure 2D:
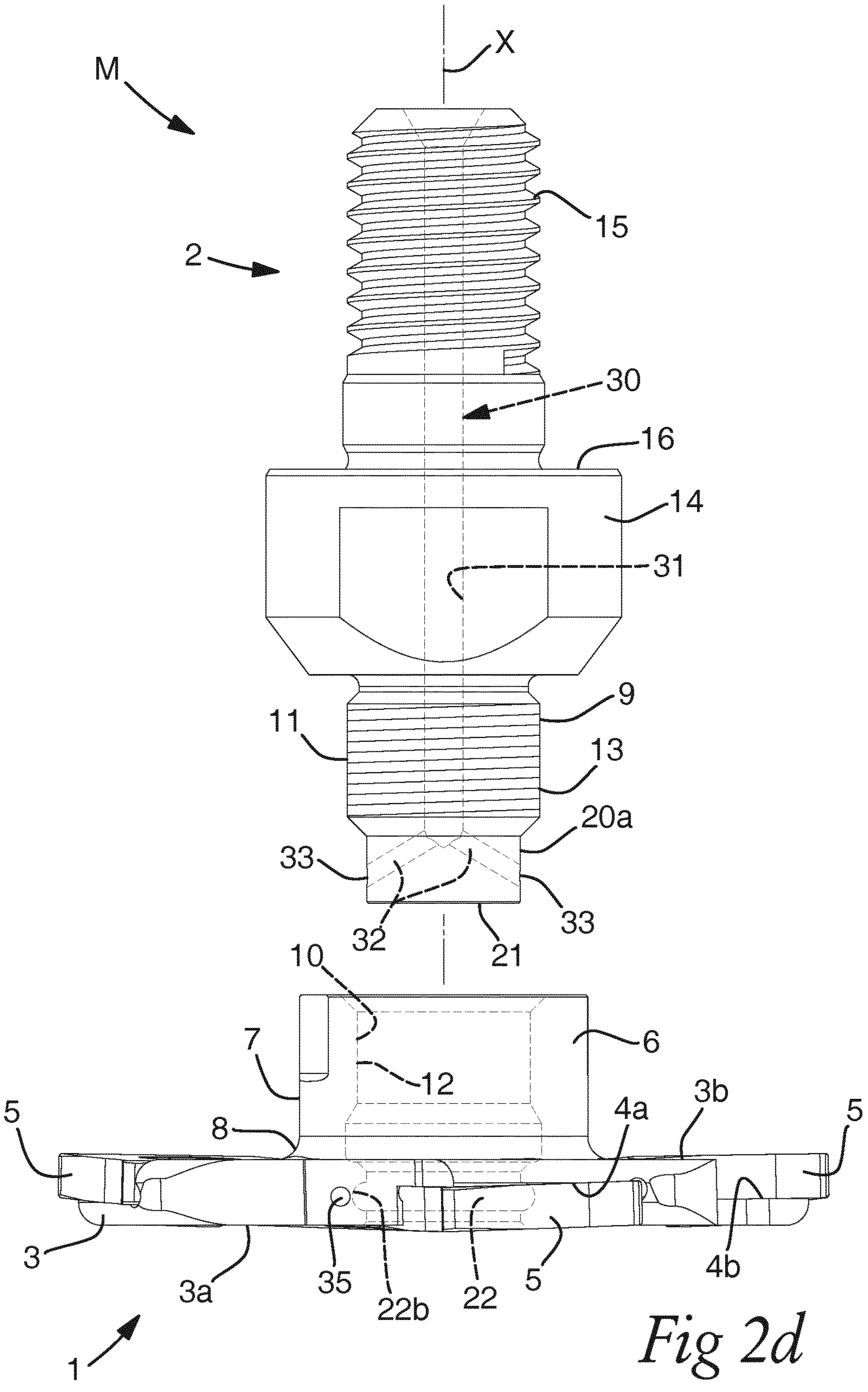
FIG. 2*d* discloses an exploded side view of the milling cutter in FIG. 2*a*.
Figure 2E:
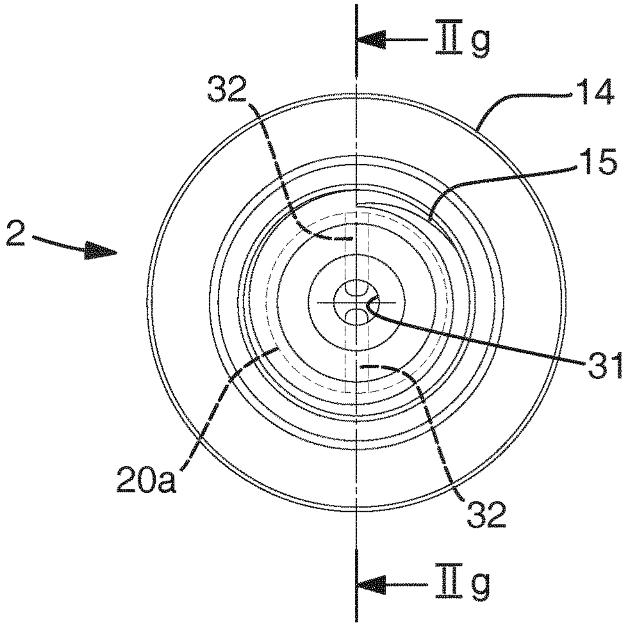
FIG. 2*e* discloses a rear view of a back end part of the milling cutter in FIG. 2*a*.
Figure 2F:
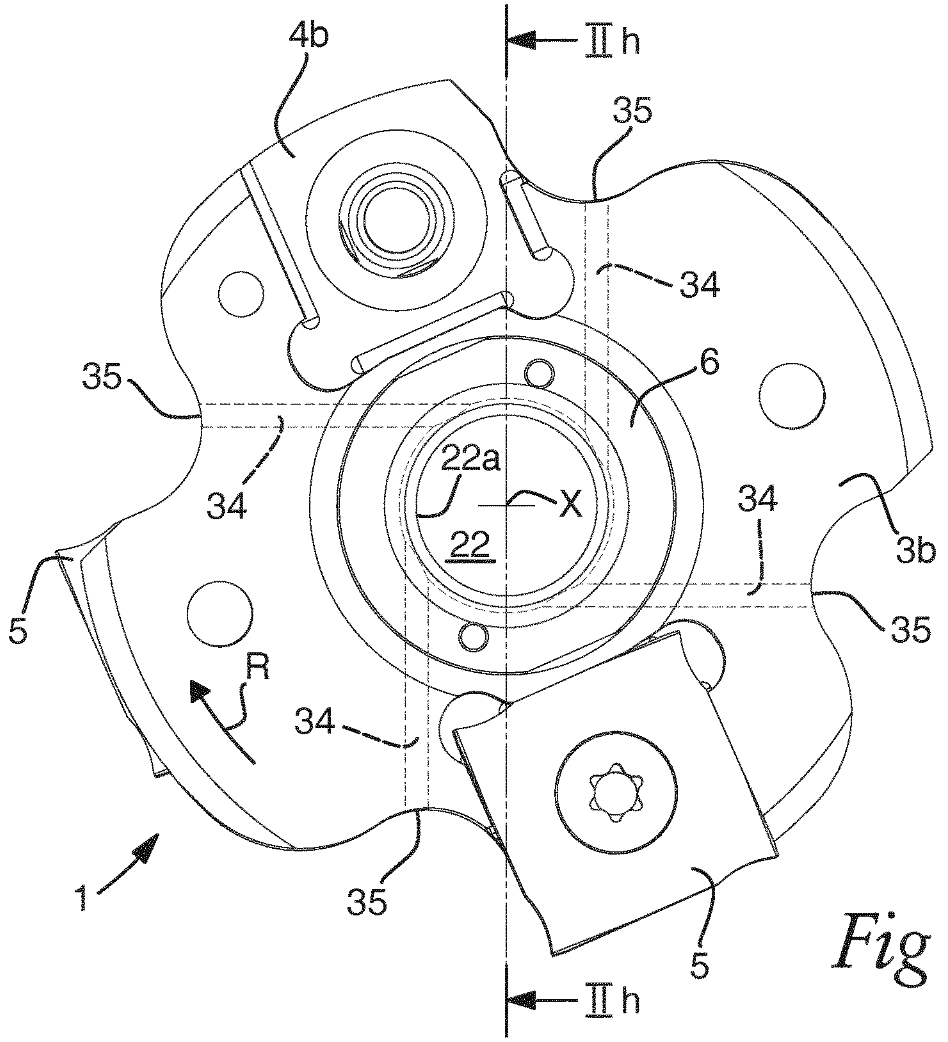
FIG. 2*f* discloses a rear view of a front end part of the milling cutter in FIG. 2*a*.
Figure 2G:
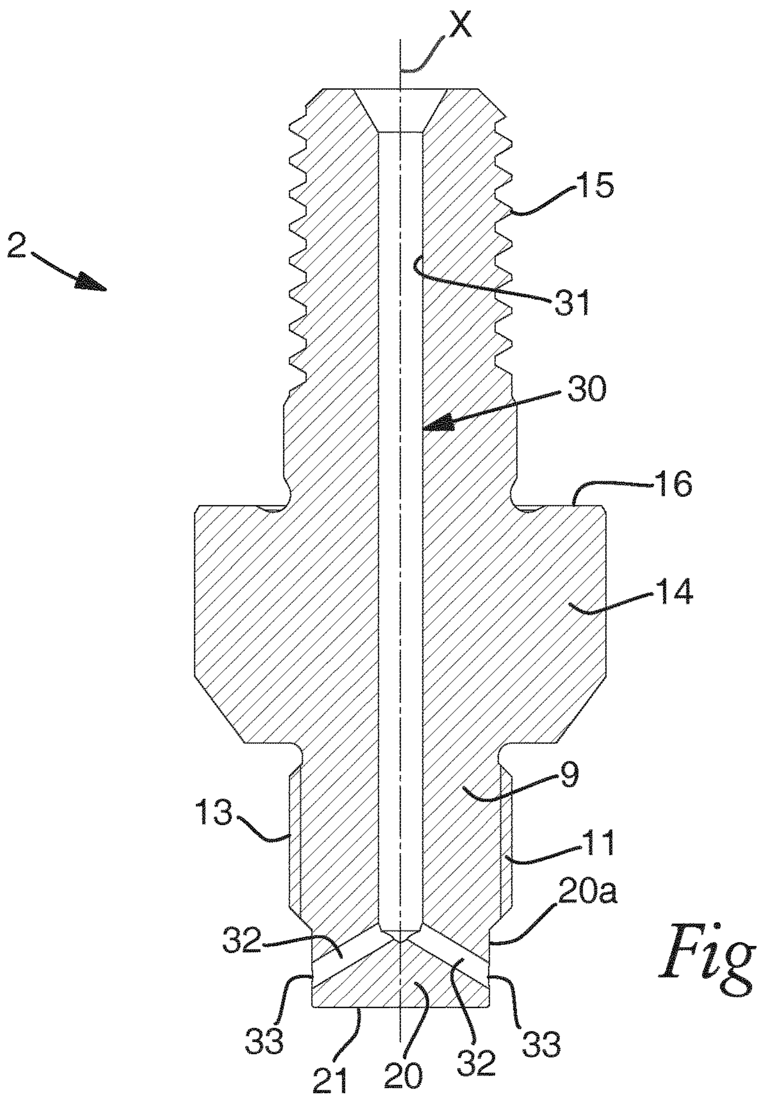
FIG. 2*g* discloses a sectional view through the back end part along the line IIg-IIg in FIG. 2*e*.
Figure 2H:
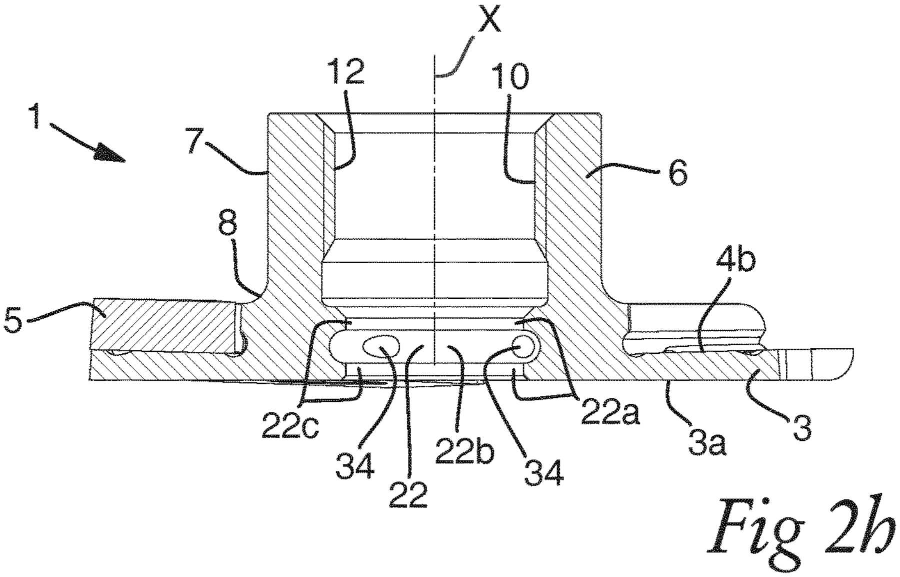
FIG. 2*h* discloses a sectional view through the front end part along the line IIh-IIh in FIG. 2*f*.
Figure 2I:
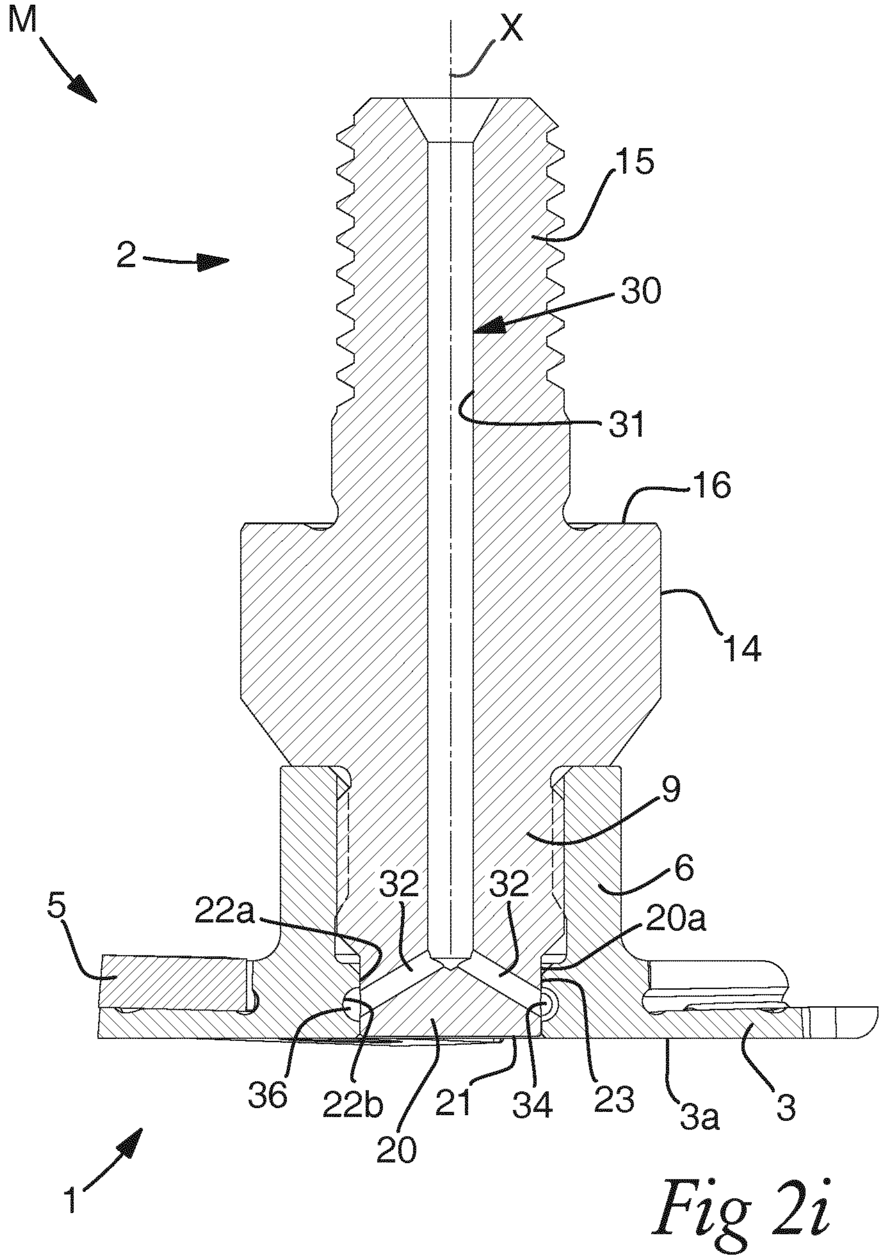
FIG. 2*i* discloses a sectional view of the back end part and the front end part as shown in FIGS. 2*g* and 2*h* mounted to each other.

The back end part 2 may also comprise an intermediate section 14 located rearwards the outer engagement region 11, see FIG. 1*d*. A fastening tap 15 may extend rearwards from the intermediate section 14 for permitting the milling cutter M to be held by a holder or a machine tool. The fastening tap 15 may have an outer thread as disclosed in FIG. 2*a*. In the first embodiment, a rear abutment surface 16 is provided at a rear side of the intermediate section 14 and extends perpendicularly to the central axis X. The fastening tap 15 extends from the rear abutment surface 16. The rear abutment surface 16 may be large enough to obtain an accurate and stable connection with the holder or the machine.

In the first embodiment, the back end part 2 has a largest outer diameter D2 at the intermediate section 14. The largest outer diameter D2 is larger than the largest outer diameter D7 of the major cylindrical zone 7 of the primary holding member 6, see FIG. 1*c*.

The secondary holding member 9 comprises a front portion 20 located in front of the outer engagement region 11 and forming the outermost end of the back end part 2, see FIG. 1*d*.

Figure 1H:
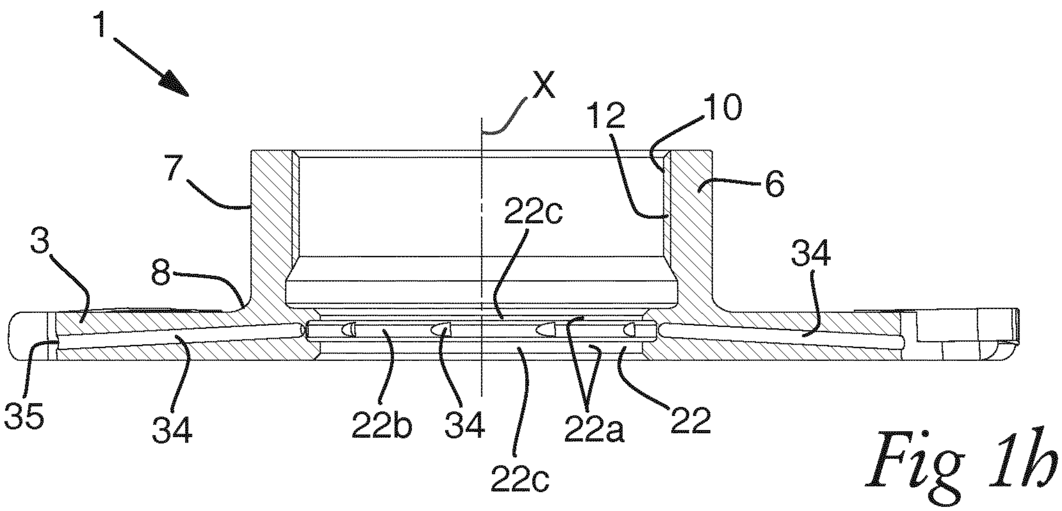
FIG. 1*h* discloses a sectional view through the front end part along the line Ih-Ih in FIG. 1*f*.
Figure 1I:
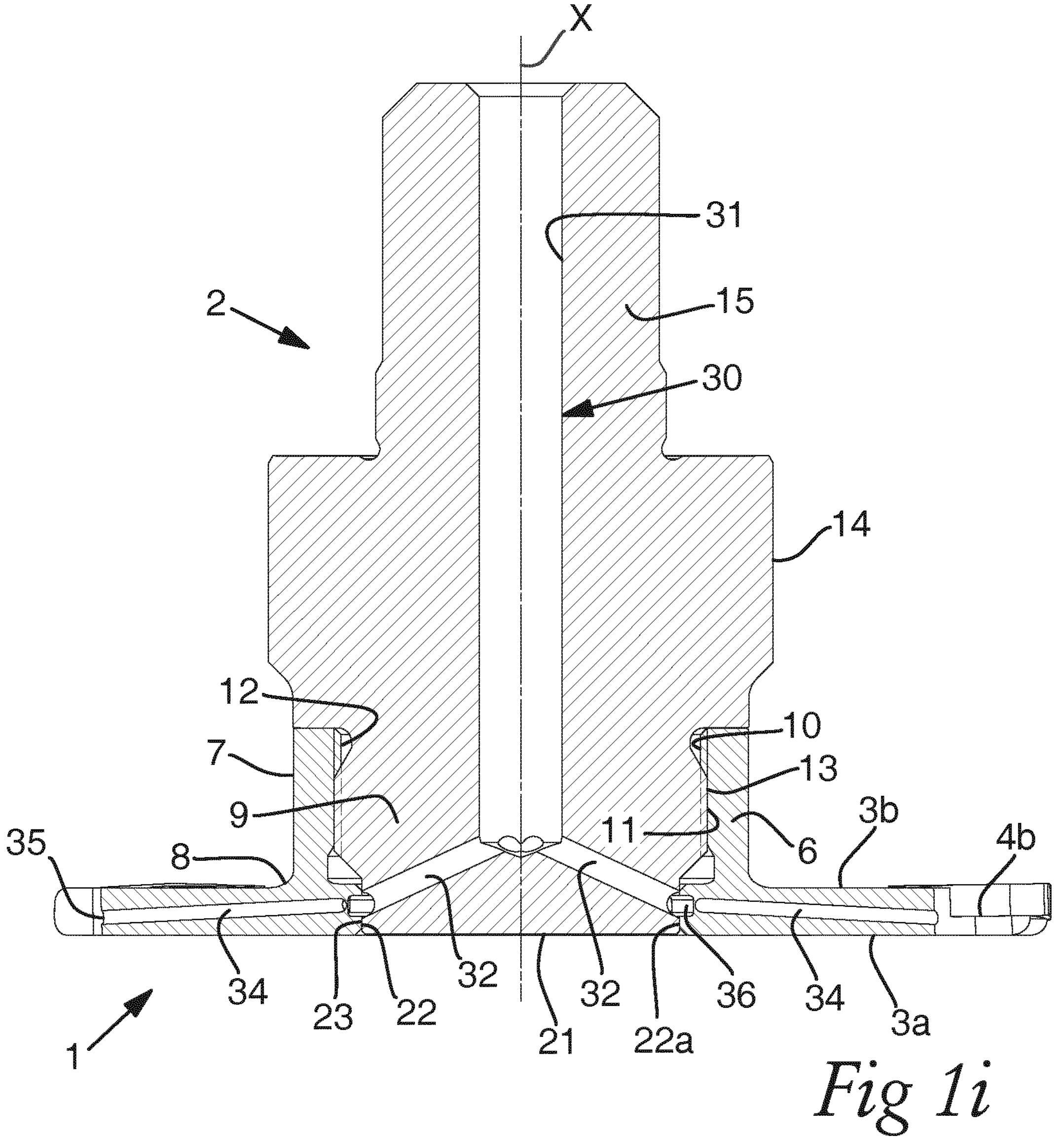
FIG. 1*i* discloses a sectional view of the back end part and the front end part as shown in FIGS. 1*g* and 1*h* mounted to each other.

In the first embodiment, the front portion 20 of the secondary holding member 9 comprises a front surface 21 lying in a plane common to the front side 3*a* of the disc-shaped cutter body 3 when the front end part 1 and the back end part 2 are mounted to each other to form the milling cutter M, see FIG. 1*i*. The milling cutter M may thus be configured to be used as an end mill cutter for forming a plane surface since no parts, except for the edges of the cutting inserts 5, protrude beyond the front side 3*a* of the disc-shaped cutter body 3.

The disc-shaped cutter body 3 comprises a central cylindrical aperture 22 extending coaxially with the central axis X. The central cylindrical aperture 22 comprises an inner cylindrical surface 22*a*, see FIGS. 1*f* and 1*h*.

The secondary holding member 9 comprises an outer cylindrical surface 20*a* provided on the front portion 20 of the secondary holding member 9 of the back end part 2, see FIGS. 1*d* and 1*g*.

In the first embodiment, the inner cylindrical surface 22*a* is an inner circular cylindrical surface, or inner continuously cylindrical surface. The outer cylindrical surface 20*a* is an outer circular cylindrical surface, or outer circumferentially continuously cylindrical surface. Both the inner cylindrical surface 22*a* and the outer cylindrical surface 20*a* are thus uninterrupted in a circumferential direction.

The inner cylindrical surface 22*a* is abutting the outer cylindrical surface 20*a* in an abutting region 23, see FIG. 1*i*. In the first embodiment, the abutting region 23 is axially located between the front side 3*a* and the rear side 3*b* of the disc-shaped cutter body 3. In particular, the abutting region 23 is located in the same axial position as the cutting inserts 5, i.e. between the most rearward position of the edge of the cutting inserts 5 in the rear insert seats 4*b* and the most forward position of the edge of the cutting inserts 5 in the front insert seats 4*a*. That means that no oblique loads, exerting stresses on the abutting region 23, may exist, and thus the centering and the holding of the disc-shaped cutter body 3 may remain stable and secure during the milling operation.

In the first embodiment, the inner cylindrical surface 22*a* and the outer cylindrical surface 20*a* present a tolerance of h6/H6 at the abutting region 23.

The abutting region 23 contributes to center the front end part 1 and the back end part 2 to each other when the front end part 1 and the back end part 2 are mounted to each other to form the milling cutter M, i.e. when the inner engagement region 10 and the outer engagement region 11 are in firm engagement with each other.

The milling cutter M may comprise a liquid supply system to be described below. The milling supply system may comprise a liquid supply channel 30 enclosed by the back end part 2 and extending through the secondary holding member 9 and the back end part. The liquid supply channel 30 comprises a central channel 31 and a number of distribution channels 32.

The central channel 31 extends axially, from a rear end of the back end part 2, through the back end part 2. In particular, the central channel 31 may extend through the fastening tap 15, the intermediate section 14 and partly through the secondary holding member 9 to a position close to the front portion 20, as can be seen in FIG. 1*g*.

The distribution channels 32 extend outwardly from the central channel 31 through the front portion 20 of the secondary holding member 9 to a respective intermediate outlet 33.

The liquid supply system may also comprise liquid channels 34, which extend outwardly in the disc-shaped cutter body 3 to a respective liquid outlet 35 through the outer periphery of the disc-shaped cutter body 3. The liquid outlets 35 are located in front of the respective cutting insert 5 with regard to the rotary direction R.

The liquid channels 34 are located between the front side 3*a* and the rear side 3*b* of the disc-shaped cutter body 3. In particular, the liquid channels 34 may have a straight extension and may lie in a common plane, especially an axial plane, or a substantially axial plane. Moreover, each liquid channel 34 may extend along a respective straight line from and through the outer periphery to and into the central cylindrical aperture 22 of the disc-shaped cutter body 3, especially through the inner cylindrical surface 22*a*, wherein the liquid channels 34 extend outwardly from the central cylindrical aperture 22.

Furthermore, the liquid supply system may comprise an annular channel 36 extending around the front portion 20 of the secondary holding member 9, see FIG. 1*i*. The liquid channels 34 may extend outwardly from the annular channel 36, and the intermediate outlets 33 may adjoin the annular channel 36.

The annular channel 36 is formed or enclosed by the inner cylindrical surface 22*a* and the outer cylindrical surface 20*a* by means of a suitable configuration of the inner and outer cylindrical surfaces 22*a* and 22*b*. To that end, the annular channel 36 may comprise at least one of a primary annular groove 22*b*, see FIG. 1*h*, extending through the inner cylindrical surface 22*a* and a secondary annular groove 20*b*, see FIG. 1*d*, extending through the outer cylindrical surface 20*a*.

In the first embodiment, the annular channel 36 is formed by the primary annular groove 22*b*, extending through the inner cylindrical surface 22*a* of central cylindrical aperture 22 of the disc-shaped cutter body 3, and the secondary annular groove 20*b* extending through the outer cylindrical surface 20*a* of the front portion 20 of the secondary holding member 9. The primary annular groove 22*b* and the secondary annular groove 20*b* have in the first embodiment the same axial position. The annular channel 36, formed by the primary annular groove 22*b* and the secondary annular groove 20*b*, may have a circular cross-section or substantially circular cross-section.

In the first embodiment, the primary annular groove 22*b* divides the inner cylindrical surface 22*a* into two inner cylindrical sub-faces 22*c*, see FIG. 1*h*, and the secondary annular groove 20*b* divides the outer cylindrical surface 20*a* into two outer cylindrical sub-faces 20*c*, see FIG. 1*d*. Thus, the inner cylindrical sub-faces 22*c* may abut a respective one of the outer cylindrical sub-faces 20*c*.

In the first embodiment, a front inner cylindrical sub-face 22*c* abuts a front outer cylindrical sub-face 20*c*, which sub-faces 22*c* and 20*c* may be located axially close to the front side. A rear inner cylindrical sub-face 22*c* abuts a rear outer cylindrical sub-face 20*c*, which may be located axially close to the rear side 3*b*.

Liquid may thus be supplied through the milling cutter M by means of the liquid supply system described above. The liquid is then introduced into the liquid supply channel 30, i.e. into the central channel 31 and from there transported via the distribution channels 32 and the intermediate outlets 33 into the annular channel 36. From the annular channel 36, the liquid is transported via the liquid channels 34 to a respective one of the liquid outlets 35 through the outer periphery of the disc-shaped cutter body 3.

The liquid supplied by the liquid supply system may provide an efficient cooling of the disc-shaped cutter body 3 and the cutting inserts 5. The position of the liquid outlets 35 in front of the cutting inserts 5 contributes to an efficient cooling and to an efficient removal of chips produced during the milling operation. These effects contribute together to a long lifetime of the disc-shaped cutter body 3 and the cutting inserts 5.

FIGS. 2*a*-2*i* refer to a second embodiment of the milling cutter M. The same reference signs have been used for elements having the same or similar functions in all the embodiments disclosed.

The second embodiment differs from the first embodiment in that it comprises only four insert seats 4*a*, 4*b* and in that the outer diameter of the disc-shaped-cutter body 3 is smaller than in the first embodiment. This smaller diameter of the disc-shaped cutter body 3 may be achieved thanks to the relatively small largest diameter D7 of the major cylindrical zone 7 of the primary holding member 6, see FIG. 2*c*.

Furthermore, in the second embodiment the annular channel 36 is formed by the primary annular groove 22*b*, which extends through the inner cylindrical surface 22*a* of the disc-shaped cutter body 3, and by the outer cylindrical surface 20*a* of the front portion 20. In the second embodiment, the annular channel 36 may thus have a semicircular cross-section, see FIG. 2*i*.

In a third embodiment not disclosed in the drawings, the annular channel 36 may be formed by the secondary annular groove 20*b*, which extends through the outer cylindrical surface 20*a* of the front portion 20, and by the inner cylindrical surface 22*a* of the disc-shaped cutter body 3. Also in the third embodiment, the annular channel 36 may have a semicircular cross-section.

It should be noted that the milling cutter may comprise another number of cutting inserts 5 than ten or four as comprised by the milling cutter of the above described second embodiments.

The invention is not limited to the embodiments disclosed but may be varied and modified within the scope of the following claims.

The invention claimed is:

1. A milling cutter comprising:

a front end part, the front end part including a disc-shaped cutter body having a front side and a rear side and being configured to rotate in a rotary direction around a central axis, a number of insert seats arranged at an outer periphery of the disc-shaped cutter body, and a primary holding member extending around and along the central axis from the rear side of the disc-shaped cutter body and away from the disc-shaped cutter body; and a back end part, the back end part including a secondary holding member engaging the primary holding member when the front end part and the back end part are mounted to each other to form the milling cutter, the disc-shaped cutter body having a central cylindrical aperture extending coaxially with the central axis, wherein the central cylindrical aperture includes an inner cylindrical surface, wherein the secondary holding member includes an outer cylindrical surface provided on a front portion of the secondary holding member of the back end part, and wherein the inner cylindrical surface abuts the outer cylindrical surface in an abutting region axially located at least between the front side and the rear side in order to center the front end part and the back end part to each other when the front end part and the back end part are mounted to each other to form the milling cutter, wherein the primary holding member includes an inner engagement region located at an axial distance from the rear side of the disc-shaped cutter body and from the central cylindrical aperture and cooperating with an outer engagement region of the secondary holding member, wherein the inner engagement region includes an inner thread and the outer engagement region includes an outer thread, and wherein the inner thread and the outer thread engage each other when the front end part and the back end part are mounted to each other to form the milling cutter.

2. The milling cutter according to claim 1, further comprising liquid channels extending outwardly in the disc-shaped cutter body to a respective liquid outlet through the outer periphery of the disc-shaped cutter body, wherein the liquid channels are located between the front side and the rear side of the disc-shaped cutter body and wherein the liquid channels extend outwardly from the central cylindrical aperture.

3. The milling cutter according to claim 2, wherein the inner cylindrical surface and the outer cylindrical surface are configured to form an annular channel extending around the front portion of the secondary holding member, and wherein the liquid channels extend outwardly from the annular channel.

4. The milling cutter according to claim 3, wherein the annular channel-includes at least one of a primary annular groove extending through the inner cylindrical surface and a secondary annular groove extending through the outer cylindrical surface.

5. The milling cutter according to claim 4, wherein the primary annular groove divides the inner cylindrical surface into two inner cylindrical sub-faces.

6. The milling cutter according to claim 5, wherein the secondary annular groove divides the outer cylindrical surface into two outer cylindrical sub-faces.

7. The milling cutter according to claim 3, wherein the back end part encloses a liquid supply channel extending through the secondary holding member and further comprising a central channel extending axially in the back end part, and a number of distribution channels extending outwardly from the central channel through the front portion of the secondary holding member to a respective intermediate outlet in order to permit liquid transport from the liquid supply channel to the liquid channels.

8. The milling cutter according to claim 7, wherein the at least one intermediate outlet adjoins the annular channel.

9. The milling cutter according to claim 1, wherein the front portion of the secondary holding member includes a front surface lying in a plane common to the front side of the disc-shaped cutter body when the front end part and the back end part are mounted to each other to form the milling cutter.

10. The milling cutter according to claim 1, wherein the disc-shaped cutter body includes a number of cutting inserts provided in a respective one of the insert seats.

11. The milling cutter according to claim 10, wherein the liquid outlets are located in front of a respective one of the cutting inserts with regard to the rotary direction.

12. The milling cutter according to claim 11, wherein the liquid channels extend outwardly in a respective outward direction towards an active cutting edge of the respective cutting insert.

13. The milling cutter according to claim 1, wherein the insert seats include front insert seats, extending from the front side, and rear insert seats, extending from the rear side, and wherein the front insert seats and the rear insert seats are arranged in an alternating order along the outer periphery of the disc-shaped cutter body.

14. The milling cutter according to claim 1, wherein the primary holding member of the front end part includes a major cylindrical zone and a minor transition zone connecting the major cylindrical zone to the rear side of the disc-shaped cutter body, and wherein the back end part has a largest outer diameter that is larger than a largest outer diameter of the major cylindrical zone.

15. The milling cutter according to claim 1, wherein a locking interface, which is formed by the engagement between the primary and secondary holding members, is arranged outside the central cylindrical aperture and the front portion of the secondary holding member.

16. A milling cutter comprising:

a front end part, the front end part including a disc-shaped cutter body having a front side and a rear side and being configured to rotate in a rotary direction around a central axis, a number of insert seats arranged at an outer periphery of the disc-shaped cutter body, and a primary holding member extending around and along the central axis from the rear side of the disc-shaped cutter body and away from the disc-shaped cutter body; and a back end part, the back end part including a secondary holding member engaging the primary holding member when the front end part and the back end part are mounted to each other to form the milling cutter, the disc-shaped cutter body having a central cylindrical aperture extending coaxially with the central axis, wherein the central cylindrical aperture includes an inner cylindrical surface, wherein the secondary holding member includes an outer cylindrical surface provided on a front portion of the secondary holding member of the back end part, wherein the inner cylindrical surface abuts the outer cylindrical surface in an abutting region axially located at least between the front side and the rear side in order to center the front end part and the back end part to each other when the front end part and the back end part are mounted to each other to form the milling cutter;

liquid channels extending outwardly in the disc-shaped cutter body to a respective liquid outlet through the outer periphery of the disc-shaped cutter body, wherein the liquid channels are located between the front side and the rear side of the disc-shaped cutter body and wherein the liquid channels extend outwardly from the central cylindrical aperture; and a locking interface, which is formed by the engagement between the primary and secondary holding members, is arranged outside the central cylindrical aperture and the front portion of the secondary holding member.

17. A milling cutter comprising:

a front end part, the front end part including a disc-shaped cutter body having a front side and a rear side and being configured to rotate in a rotary direction around a central axis, a number of insert seats arranged at an outer periphery of the disc-shaped cutter body, and a primary holding member extending around and along the central axis from the rear side of the disc-shaped cutter body and away from the disc-shaped cutter body; and a back end part, the back end part including a secondary holding member engaging the primary holding member when the front end part and the back end part are mounted to each other to form the milling cutter, the disc-shaped cutter body having a central cylindrical aperture extending coaxially with the central axis, wherein the central cylindrical aperture includes an inner cylindrical surface, wherein the secondary holding member includes an outer cylindrical surface provided on a front portion of the secondary holding member of the back end part, and wherein the inner cylindrical surface abuts the outer cylindrical surface in an abutting region axially located at least between the front side and the rear side in order to center the front end part and the back end part to each other when the front end part and the back end part are mounted to each other to form the milling cutter; and liquid channels extending outwardly in the disc-shaped cutter body to a respective liquid outlet through the outer periphery of the disc-shaped cutter body, wherein the liquid channels are located between the front side and the rear side of the disc-shaped cutter body and wherein the liquid channels extend outwardly from the central cylindrical aperture, wherein the inner cylindrical surface and the outer cylindrical surface are configured to form an annular channel extending around the front portion of the secondary holding member, and wherein the liquid channels extend outwardly from the annular channel, and wherein the annular channel divides the abutting region into two abutting subregions.

* * * * *